(No Model.)
A. J. LANE.
COFFEE POT.
No. 376,319. Patented Jan. 10, 1888.
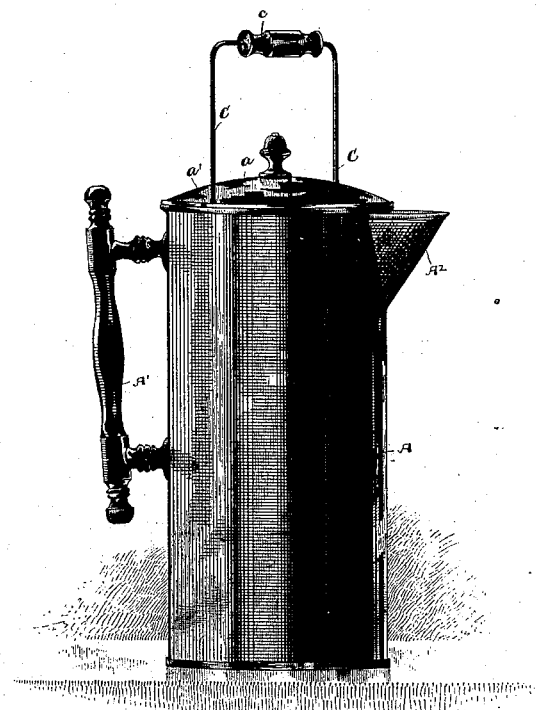
Fig. 1
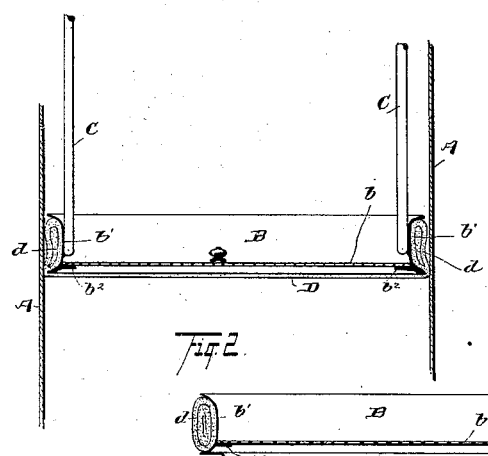
Fig. 2
Fig. 4
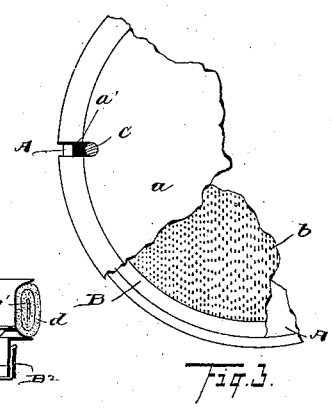
Fig. 3
WITNESSES
N. S. Annstutz
Geo. W. King
Alfred J. Lane INVENTOR
By
Leggett & Leggett
Attorneys

UNITED STATES PATENT OFFICE.

ALFRED J. LANE, OF GLENVILLE, OHIO.

COFFEE-POT.

SPECIFICATION forming part of Letters Patent No. 376,319, dated January 10, 1888.

Application filed April 9, 1887. Serial No. 234,263. (No model.)

*To all whom it may concern:*

Be it known that I, ALFRED J. LANE, of Glenville, in the county of Cuyahoga and State of Ohio, have invented certain new and useful Improvements in Coffee-Pots; and I do hereby declare the following to be a full, clear, and exact description of the invention, such as will enable others skilled in the art to which it pertains to make and use the same.

My invention is an improvement in coffee-pots; and it consists in certain features of construction and in combination of parts hereinafter described, and pointed out in the claims.

In the accompanying drawings, Figure 1 is a view in perspective of my improved coffee-pot. Fig. 2 is a vertical section through the center of the piston and container, only a portion of the latter being shown. Fig. 3 is a top plan, portions being broken away, to show the internal construction. Fig. 4 is a modification hereinafter described.

A represents a cylindrical container or coffee-pot, provided, in the usual manner, with a handle, A', and a spout, $A^2$, and provided with a removable cover, $a$.

B is a cup-piston—that is to say, a piston having an upturned rim—the latter fitting loosely inside of the container, with a bail, C, secured to the piston-rim and extending up through notches $a'$, made in the edge of the cover, the bail, some distance above the cover, being provided with a suitable handle, $c$. With such construction the cover, when lifted from the pot, may be removed from the bail by tilting the cover, or the piston may be removed from the pot, carrying the cover with it. The piston has a removable perforated metal bottom, $b$, and an annular groove, $b'$, made in the flange of the piston, opening outward. A cloth-strainer, D, preferably of canton-flannel, is placed underneath the piston and secured thereto in the following manner: A strip, preferably of the same material as the strainer, and long enough to reach around the piston, is folded lengthwise and the ends thereof sewed together, forming a band, $d$, of suitable width and thickness to fill the groove $b'$. This band serves as a packing for the piston to make a tight joint with the container. A circular piece of material, of the same diameter as the piston and constituting the strainer proper, D, is sewed along the edge thereof to the lower edge of the band $d$, the latter having sufficient elasticity to admit of the strainer being placed onto or removed from the piston. The strainer may, therefore, be removed for washing, and a new strainer may be substituted as often as is necessary at a trifling cost.

In operating the device the piston, by means of the bail, is first depressed to the bottom of the container, after which fine-ground coffee is placed in the pot, and a suitable quantity of water heated to the boiling-point is poured over the coffee, after which the coffee-pot may be immediately set on the table. After standing a few minutes the piston is drawn up to near the top of the pot, thus producing a suction that draws the water down through the coffee, perforated bottom, and strainer. The finer particles of coffee will pass through the perforated bottom of the piston, and were no other means of percolation had would leave the extract somewhat roily. The strainer, however, serves as a filter and leaves the extract free from sediment. After the piston has been drawn up, as aforesaid, it may be depressed and again elevated; but usually one operation is all that is required to extract substantially all the strength of the coffee, provided the latter has been finely ground.

The piston may be removed from the pot, carrying with it the coffee ground, the cover being returned to the pot; or the piston may be left in its elevated position next below the cover, in which case the extract can pass to the spout underneath the piston, when the container is tilted to the usual position in pouring coffee.

In Fig. 4 a modification is shown, where the strainer-cloth D is fastened to a reduced part, B', of the piston by means of a band, $B^2$, the packing-band $d$ being left separate from the strainer-cloth. This latter construction costs a trifle more than the construction shown in Fig. 2, but otherwise is perhaps preferable. With either construction the removable perforated metal bottom $b$ rests on an internal ledge, $b^2$, and by removing this bottom the strainer-cloth is easily cleaned without removing the latter from the piston.

What I claim is—

1. The combination, with a cylindrical coffee-pot, a cup-piston, and suitable attachment for operating the latter, the piston having a removable perforated metal bottom and an annular outside groove, of a cloth strainer detachably secured at the bottom of the piston, and a packing-band, preferably of cloth, made to fit into the groove of the piston, substantially as set forth.

2. The combination, with coffee-pot, cup-piston, and removable strainer, substantially as indicated, of a bail secured to the rim of the piston and made to extend through notches at the periphery of the cover, the said bail having a suitable handle attached at the top, substantially as set forth.

In testimony whereof I sign this specification, in the presence of two witnesses, this 17th day of March, 1887.

ALFRED J. LANE.

Witnesses:
CHAS. H. DORER,
ALBERT E. LYNCH.